(12) United States Patent
Hillen et al.

(10) Patent No.: US 10,398,269 B2
(45) Date of Patent: Sep. 3, 2019

(54) FLOOR CLEANING DEVICE FOR DRY AND WET CLEANING AS WELL AS METHOD FOR OPERATING A SELF-PROPELLED FLOOR CLEANING DEVICE

(71) Applicant: Vorwerk & Co. Interholding GmbH, Wuppertal (DE)

(72) Inventors: Lorenz Hillen, Wuppertal (DE); Martin Meggle, Herzebock (DE); Jenny Scheffel, Cologne (DE); Jan Von Der Heyden, Hueckeswagen (DE); Nazil Eidmohammadi, Goeteborg (SE); Sabrina Hoffmann, Solingen (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 8 days.

(21) Appl. No.: 14/808,224

(22) Filed: Jul. 24, 2015

(65) Prior Publication Data
US 2016/0037983 A1 Feb. 11, 2016

(30) Foreign Application Priority Data

Aug. 6, 2014 (DE) .......................... 10 2014 111 217

(51) Int. Cl.
*B08B 7/00* (2006.01)
*A47L 7/00* (2006.01)
(Continued)

(52) U.S. Cl.
CPC ........... *A47L 7/0004* (2013.01); *A47L 9/2826* (2013.01); *A47L 9/2847* (2013.01); *A47L 9/2852* (2013.01);
(Continued)

(58) Field of Classification Search
CPC .. A47L 11/145; A47L 11/201; A47L 11/4011; A47L 11/29; A47L 2201/04;
(Continued)

(56) References Cited

U.S. PATENT DOCUMENTS

| 5,722,109 A | * | 3/1998 | Delmas | ................... A47L 9/281 15/319 |
| 5,815,880 A | | 10/1998 | Nakanishi | |

(Continued)

FOREIGN PATENT DOCUMENTS

| DE | 102 42 257 A1 | 4/2003 |
| DE | 103 57 637 A1 | 7/2005 |

(Continued)

OTHER PUBLICATIONS

European Search Report in EP 15 17 8218 dated May 11, 2016.
European Search Report in EP 15 17 8218 dated Sep. 6, 2016.

*Primary Examiner* — Binh X Tran
*Assistant Examiner* — Christopher Remavege
(74) *Attorney, Agent, or Firm* — Collard & Roe, P.C.

(57) ABSTRACT

A method for operating a self-propelled floor cleaning device, in a first operating step, drives the floor cleaning device across a first treatment path across the floor to be cleaned according to a predetermined driving strategy, or according to a predetermined algorithm, which is calculated on the basis of data, which are detected by sensors and thereby carries out a first cleaning step by a first cleaning device. In the first operating step, areas of the floor surfaces to be cleaned, which are cleaned in at least a second operating step by a second cleaning device, or which are excluded from the cleaning by the second cleaning device, are determined. A floor cleaning device, which is suitable for carrying out the method, has a chassis, a first cleaning device (Continued)

for dry cleaning a floor surface, and a second cleaning device for wet cleaning areas of the floor surface.

4 Claims, 2 Drawing Sheets

(51) Int. Cl.
*A47L 9/28* (2006.01)
*A47L 11/14* (2006.01)
*A47L 11/20* (2006.01)
*A47L 11/40* (2006.01)

(52) U.S. Cl.
CPC .......... *A47L 11/145* (2013.01); *A47L 11/201* (2013.01); *A47L 11/4011* (2013.01); *A47L 2201/04* (2013.01)

(58) Field of Classification Search
CPC .... A47L 7/0004; A47L 9/2826; A47L 9/2847; A47L 9/2852
USPC .................. 15/319, 320, 347, 363; 134/6
See application file for complete search history.

(56) References Cited

U.S. PATENT DOCUMENTS

| 7,620,476 | B2* | 11/2009 | Morse | A47L 5/14 |
| | | | | 15/319 |
| 9,615,712 | B2* | 4/2017 | Dooley | A47L 11/284 |
| 9,931,010 | B2* | 4/2018 | Tanaka | A47L 9/2857 |
| 2005/0000543 | A1 | 1/2005 | Taylor et al. | |
| 2005/0166354 | A1* | 8/2005 | Uehigashi | A47L 9/2805 |
| | | | | 15/319 |
| 2006/0085095 | A1* | 4/2006 | Reindle | A47L 9/2821 |
| | | | | 700/258 |
| 2006/0190133 | A1* | 8/2006 | Konandreas | A22C 17/0013 |
| | | | | 700/245 |
| 2006/0288519 | A1* | 12/2006 | Jaworski | A47L 11/28 |
| | | | | 15/340.1 |
| 2007/0016328 | A1* | 1/2007 | Ziegler | A47L 5/14 |
| | | | | 700/245 |
| 2007/0267570 | A1 | 11/2007 | Park et al. | |
| 2010/0228394 | A1 | 9/2010 | Yi et al. | |
| 2012/0247510 | A1* | 10/2012 | Chen | G05D 1/0274 |
| | | | | 134/18 |
| 2012/0265343 | A1* | 10/2012 | Gilbert, Jr. | A47L 11/34 |
| | | | | 700/259 |
| 2013/0054022 | A1* | 2/2013 | Jang | A47L 9/2805 |
| | | | | 700/245 |
| 2013/0152970 | A1 | 6/2013 | Porat | |
| 2013/0228199 | A1* | 9/2013 | Hung | A47L 9/2852 |
| | | | | 134/18 |
| 2013/0275164 | A1 | 10/2013 | Gruber et al. | |
| 2013/0326839 | A1 | 12/2013 | Cho et al. | |
| 2014/0166047 | A1 | 6/2014 | Hillen et al. | |
| 2014/0214205 | A1* | 7/2014 | Kwon | A47L 9/2826 |
| | | | | 700/258 |
| 2014/0303775 | A1 | 10/2014 | Oh et al. | |
| 2014/0316636 | A1 | 10/2014 | Hong et al. | |
| 2014/0316841 | A1 | 10/2014 | Kilby et al. | |
| 2015/0297047 | A1* | 10/2015 | Van Der Kooi | A47L 7/0009 |
| | | | | 15/364 |

FOREIGN PATENT DOCUMENTS

| DE | 10 2008 014 912 A1 | 9/2009 |
| DE | 10 2009 024 990 A1 | 12/2010 |
| DE | 10 2009 059 217 A1 | 2/2011 |
| DE | 10 2009 052 629 A1 | 5/2011 |
| DE | 10 2010 000 174 A1 | 7/2011 |
| DE | 10 2010 015 941 A1 | 9/2011 |
| DE | 10 2010 016 553 A1 | 10/2011 |
| EP | 2 471 426 A2 | 7/2012 |
| EP | 2 741 483 A2 | 6/2014 |
| EP | 2471426 A3 * | 2/2018 |
| WO | 2005/055795 A1 | 6/2005 |

* cited by examiner

FLOOR CLEANING DEVICE FOR DRY AND WET CLEANING AS WELL AS METHOD FOR OPERATING A SELF-PROPELLED FLOOR CLEANING DEVICE

CROSS REFERENCE TO RELATED APPLICATIONS

Applicant claims priority under 35 U.S.C. § 119 of German Application No. 10 2014 111 217.2 filed Aug. 6, 2014, the disclosure of which is incorporated by reference.

BACKGROUND OF THE INVENTION

1. Field of the Invention

The invention relates to a method for operating a self-propelled floor cleaning device, wherein, in a first operating step, the floor cleaning device drives across a first treatment path across the floor, which is to be cleaned, according to a predetermined driving strategy or according to a predetermined algorithm, which is calculated on the basis of data, which are detected by means of sensors and which thereby carries out a first cleaning step by means of a first cleaning device.

The invention furthermore relates to a self-propelled floor cleaning device comprising a control device, which is equipped to carry out the method.

2. Description of the Related Art

Self-propelled floor cleaning devices are known in the state of the art, for example DE 102 42 257 A1 discloses such a device.

Such a floor cleaning robot has a drive unit, sensors for detecting the environment and a processing unit for processing and for generating driving commands for the drive. The processing unit is a programmable control device or a control device, which operates according to a program, and which is able to orientate itself in a room, which is to be cleaned. Methods for orientating a cleaning robot in the room, for creating maps and for preparing treatment paths on floor surfaces, which are to be cleaned, are known from EP 2 471 426 A2, from DE 10 2010 000 174 A1, from DE 10 2009 059 217 A1, from DE 10 2010 015 941 A1, from DE 10 2010 016 553 A1 and from DE 10 2008 014 912 A1. A first cleaning step is carried out in a first operating step by means of a first cleaning device by means of the known orienting methods, methods for recognizing hurdles or methods for recognizing surface characteristics of the floor surfaces, which are to be cleaned and for forming driving paths.

It is furthermore known in the state of the art to use two cleaning devices, which differ from one another, in two consecutive operating steps. A dry cleaning, in response to which dust particles are extracted from the surface, which is to be cleaned, by means of a suction device, is carried out by means of the first cleaning device in a first cleaning step. By means of a second cleaning device, a wet cleaning, during which the floor is wetted, mopped and the remaining moisture is collected, is then carried out in a second cleaning step.

SUMMARY OF THE INVENTION

The invention is based on the object of improving the above-mentioned method so as to make the use thereof advantageous and to specify a device, which can be used for this purpose.

The object is solved by means of an invention, which is specified in the claims.

In a first operating step, a first operating path is driven across. In this operating step, the self-propelled floor cleaning device can preferably drive across the entire floor, which is to be cleaned. The floor cleaning device can determine the surface quality of the floor surfaces during the first operating step, in particular by means of on-board sensor elements. From the data obtained in this manner, the control device is able to determine areas of the floor surfaces, which are to be cleaned, which are to be cleaned in a second operating step. A second cleaning device, which differs from the first cleaning device and which carries out a second cleaning step, which differs from the first cleaning step, is used in the second operating step. Preferably, a dry cleaning, in which a mechanical cleaning member, e.g. a brush and a suction channel are used, takes place in the first cleaning step. Dust particles can be loosened mechanically from the ground by means of the brush. The loosened dust particles can be extracted into a dust collection container by means of the suction channel. Preferably, a wet cleaning takes place in the second cleaning step. The two cleaning steps are carried out by means of the same floor cleaning device, which encompasses two cleaning devices for this purpose, wherein the first cleaning step, for example the dry cleaning step, is carried out by means of the first cleaning device, and the second cleaning step, for example the wet cleaning step, is carried out by means of the second cleaning device. The wet cleaning step is preferably a mopping cleaning step, in response to which fresh water is brought onto the surface, which is to be cleaned, via a wetting device. Preferably, the floor surface, which is to be cleaned, can be impacted mechanically by means of a mopping device. The moisture is extracted by means of a suction mouth. The dirty water can be guided into a dirty water container. In a preferred embodiment, the floor cleaning device approaches a base station, in which the fresh water container is filled with fresh water and the dust collection container is cleaned, after the first operating step has ended. The dust collection container can be used as dirty water container during the second operating step. In preparation for the second operating step, a mopping of the ground, across which the cleaning robot drives, takes place during the first operating step. The ground is thereby divided into different categories with the help of the sensors. The categories comprise at least the category "to be cleaned wet" and "not to be cleaned wet". However, provision is also made for the ground to be divided into further categories, for example in different types of wet cleaning or additional cleaning means, which are to be used. Methods, which are known from the state of the art are used to differentiate the different floor types. Orientation data, for example in the form of a map, in the form of coordinates or in the form of frequency polygons, are stored within a memory of the control device. The orientation data can identify closed areas, in which, in addition to the first cleaning step, the second cleaning step is to be carried out as well, or such areas, in which the second cleaning step is not be carried out. The floor surface, which is to be cleaned, can include the floor surfaces of adjoining rooms, which are to be cleaned. Floor surfaces of entire rooms or also only parts of floor surfaces of entire rooms can be categorized. For example, the floor cleaning device can assign entire rooms to the category "not to be cleaned wet", if it determines, for example, that the floor of the room is covered with a carpet. However, provision is also made for the floor cleaning device to recognize a carpet on a floor, which otherwise belongs to the category "to be cleaned wet", and assigns the surface of the floor area, which is covered by the carpet, to the category "not to be cleaned wet". During the second operating step, only those rooms are approached, in which at least a partial area is assigned to the category "to be cleaned wet". The areas "not to be cleaned wet" are omitted in response to the second operating step.

The invention furthermore relates to the further development of a floor cleaning device, which encompasses a chassis and a first cleaning device for dry-cleaning a floor.

To increase the practical value of this device, provision is made for the floor cleaning device to encompass a second cleaning device for wet-cleaning the floor. The device according to the invention encompasses cleaning devices for different demands. The tasks "vacuuming" and "mopping" can be handled by a single device. The two cleaning devices are assigned to the floor cleaning device such that they fulfill their tasks in different driving directions. For example, it is possible to treat a floor surface in a suction mode, for example while driving forwards, and to subsequently clean the floor surface in the mopping mode while driving backwards. The above-mentioned knowledge, which is obtained in response to a dry drive across the floor surface, which is to be cleaned, can be used thereby. The knowledge relating to the spatial arrangement of the surfaces, which are to be mopped wet, which is obtained in response to the dry cleaning, can be used to define a suitable driving strategy. In a preferred embodiment of the invention, a suction channel of the second cleaning device is arranged at an end of the floor cleaning device, which is located at the rear in driving direction of the floor cleaning device. This has the advantage that the running gear or a brush arrangement of the cleaning device does not drive across the wet-cleaned floor surface. The brush of the cleaning device can also carry out a mopping function. Preferably, the floor cleaning device can be operated in two opposite driving directions. It is operated in a first driving direction for dry cleaning. In the case of this type of operation, the suction channel for extracting the dust, which is loosened mechanically from the ground, is located downstream from a mechanical cleaning member, for example a brush. The mechanical cleaning member can thereby be arranged upstream of a chassis in driving direction. The device has a dust collection container, in which the dust, which is sucked through the suction channel, can be collected. For wet cleaning, the floor cleaning device is operated in an opposite driving direction. A wetting device can then be arranged in driving direction upstream of the mechanical cleaning member or of a mopping arrangement. The suction mouth, by means of which the moisture can be extracted from the floor, is located downstream from the brush and downstream from the running gear in driving direction. This can take place with the help of suction lips of the suction mouth, which glide across the floor. To attain the suction effect, the device has a suction blower. The first and/or second cleaning device is capable of being displaced vertically, so as to bring it from an active position into a passive position.

BRIEF DESCRIPTION OF THE DRAWINGS

An exemplary embodiment of the invention will be explained below by means of the enclosed drawings.

DETAILED DESCRIPTION OF PREFERRED EMBODIMENTS

Figure 1:
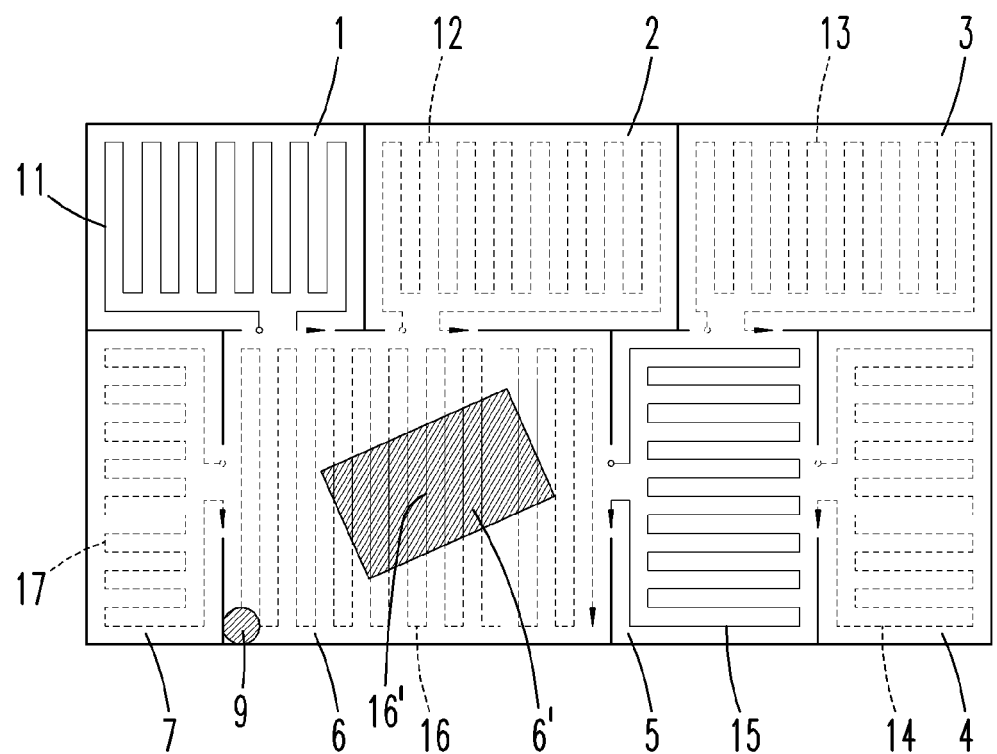
FIG. 1 shows a floor surface, which is formed by seven room floors, which is to be cleaned, wherein a driving path of a self-propelled floor cleaning device is illustrated by means of the dot and dash line and by means of the continuous line, along which the floor cleaning device drives in response to a dry cleaning, wherein the dot and dash line illustrates a driving path, along which the floor cleaning device drives in a subsequent wet cleaning phase.
Figure 2:
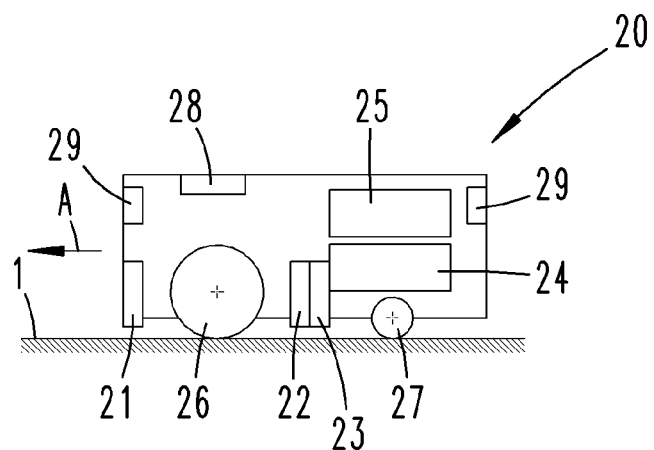
FIG. 2 shows the setup and the driving direction of a floor device during the dry cleaning in a schematic manner.
Figure 3:
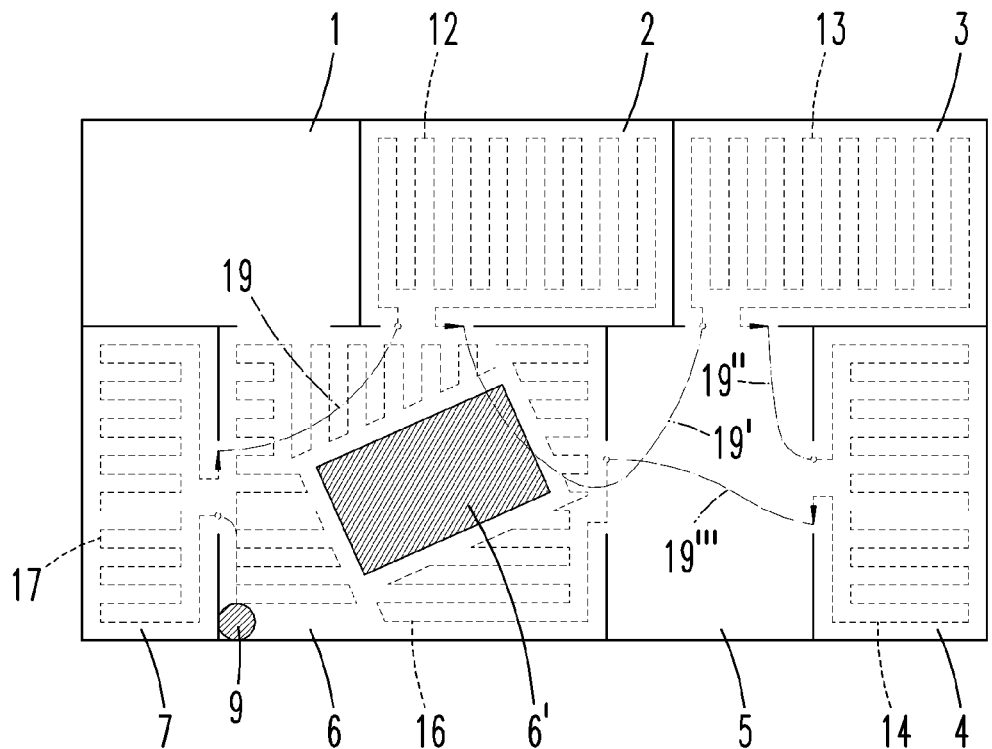
FIG. 3 shows an illustration according to FIG. 1, wherein only the driving path, which the floor cleaning device retraces in the wet cleaning phase, is illustrated by means of dashed lines
Figure 4:
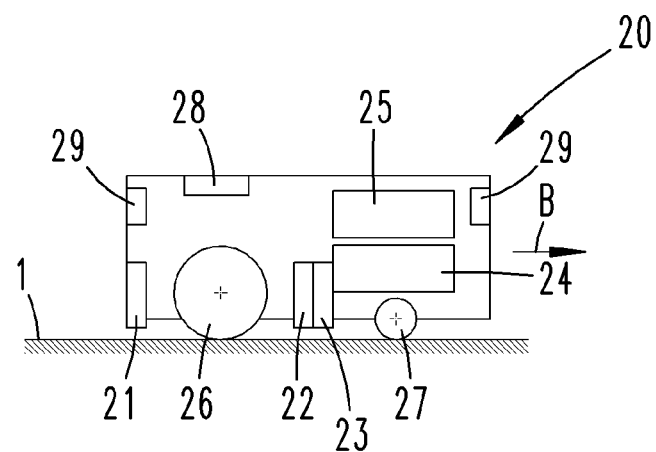
FIG. 4 shows an illustration according to FIG. 2, but in a driving direction of the wet cleaning operation.

FIGS. 2 and 4 show the setup of a self-propelled floor cleaning device in a purely schematic manner. The floor cleaning device cooperates with a base station, which is identified with 9 in FIGS. 1 and 3. The base station is able to charge accumulators of the cleaning device 20, to fill a fresh water tank 24 of the cleaning device 20 with fresh water, and to empty a collection container 25. The collection container 25 can be used as collection container for dust and as collection container for dirty water.

The self-propelled floor cleaning device 20 has sensors 29 and an electric control device 28, which has storage means. A control program and orientation data are stored in the storage means of the control device 28. With regard to the further embodiment of the floor cleaning device, with regard to the orientation skills thereof, with regard to the ability thereof to recognize obstacles and the surface characteristics of floors, which are to be cleaned, reference is made to the pertinent state of the art. In particular, the content of DE 102 42 257 B1, DE 10 2008 014 912 A1, DE 10 2010 016 553 A1, DE 10 2010 015 941 A1, DE 10 2009 059 217 A1, DE 10 2010 000 174 A1 and EP 2 471 426 A1 are included in their entirety into this application, also for the purpose of including features of these patent applications into claims of the instant invention.

The device illustrated in FIGS. 2 and 4 is able to be driven in two opposite driving directions A and B with the help of a drive wheel, which embodies a chassis 27. The chassis 27 is also able to rotate the treatment device and to drive across a predetermined treatment path. In the room, the device orientates itself by means of the sensor elements, which are identified overall with reference numerals 29, with which the control device 28 cooperates. The sensor elements 29 are also able to determine the floor characteristics of the floor and to store them in storage means.

A suction mouth 21, which encompasses suction lips, a brush 26, which can be rotatably driven by an electric motor, for example, a suction channel 22, a wetting device 23 and the already mentioned chassis 27 are located in the lower area of the chassis of the floor cleaning device 20. In addition, a housing device for generating a suction flow is located within the floor cleaning device 20.

In a first operating type, which is illustrated in FIG. 2, the floor cleaning device is driven in a first driving direction A. A dry cleaning, in response to which dust particles are loosened from the ground by means of the brush 26, takes place in this operating type. A suction flow, which transports the loosed dust into a dust collection container 25, is generated by the suction channel 22 by means of the blower. In this operating type, the brush 26 is located upstream of the suction channel 23 and upstream of the chassis 27 in driving direction.

During this first operating step, the floor cleaning device 20 drives along the treatment paths 11, 12, 13, 14, 15, 16, 16', 17, which are illustrated in FIG. 1 by means of dot and dash lines and my means of continuous lines, through a total of seven rooms comprising floor surfaces 1, 2, 3, 4, 5, 6, 7. With the help of the sensor elements 29, the control electronics 28 analyzes the floor surface. At the same time, the dry cleaning takes place by means of brush 26 and suction channel 22. The treatment preferably takes place systematically along parallel tracks. However, the treatment can also take place unsystematically along random tracks.

The floor surface 1 of the first room is assigned to the category "not to be cleaned wet", for example because the sensors recognize it as being carpet. The floor surfaces 2, 3, 4, 7 of the second, third, fourth and seventh room are assigned to the category "to be cleaned wet", for example because the sensor device recognizes them as being plastic floors. The floor surface 5 of the fifth room is assigned to the category "not to be cleaned wet, for example because it is recognized to be a sensitive wood floor. In the sixth room, the floor cleaning device 20 recognizes floor sections 6, which are to be assigned to the category "to be cleaned wet" on its driving path 16. On the driving path sections 16', the cleaning device 20 recognizes a floor surface 6', which is to be assigned to the category "not to be cleaned wet", for example because the sensor device recognizes a carpet at that location.

After finishing the first operating step, in which a dry cleaning has taken place on all of the treatment paths 11, 12, 13, 14, 15, 16, 16', 17, the cleaning device 20 approaches the base station 9. The dust collection container 25 is emptied at that location and the fresh water container 24 is filled with fresh water.

Due to the fact that a driving direction, which is directed opposite the direction of movement of the suction mode, is assigned to the mopping mode, the cleaning device 20 now changes its direction of movement. It drives in the direction of the arrow B in FIG. 4, which is directed opposite to the direction of movement A in response to the dry cleaning. A second cleaning device, which was passive during the first operating step, is now used. The first cleaning device, in particular the suction channel 22, is now passive. The floor surface is wetted by means of a wetting device 23, which is located between drive wheel 27 and suction channel 22. The brush 26 is located downstream from the wetting device 23 in driving direction B. Said brush can be inactivated, that is, lifted, during the wet treatment. However, it can also operate as mopping device. In the alternative, provision can also be made at that location for an additional mechanical cleaning aggregate, which is inactivated in response to the dry cleaning and which is lowered for wet cleaning.

A suction mouth 21 for absorbing the moisture is located downstream from the chassis 27 and the brush 26 in driving direction B. The suction mouth can encompass suction lips, which glide, across the floor surface. The suction mouth 21 can be connected to a suction channel, by means of which the blower device generates an intake flow, so that the moisture can be extracted from the floor 1 and can be collected in the collection container 25. In the case of the exemplary embodiment, the dirty water is collected in the dust collection container. The collection container 25 is thus used in two ways. A mopping device can also be assigned locally to the suction mouth 21, so that the brush 26 does not need to take over a mopping function.

During the second operating step, the floor cleaning device drives across the treatment paths 12, 13, 14, 16 and 17 illustrated in FIG. 3. The floor surfaces 2, 3, 4, 5, 6 and 7 are thereby cleaned wet completely. The transfer paths from room to room are clarified with reference numerals 19, 19', 19" and 19''' as dotted lines.

The area of the floor surface 6', which was recognized as carpet in the sixth room, is omitted in response to the wet cleaning. During the wet cleaning mode, the robot, which embodies the floor cleaning device 20, thus specifically approaches only the areas, which had been categorized as "to be cleaned wet" in response to the previous dry cleaning. The areas of the floor surface, which are assigned to the category "not to be cleaned wet" in response to the dry cleaning, are omitted by the driving path of the floor cleaning device. The floor cleaning device can either bypass the omitted areas or can drive over them. The floor cleaning device is then able to merge into a third operating state, a "drive-over mode", in which it neither carries out a dry cleaning nor a wet cleaning.

Due to the fact that the wet cleaning unit 21 in the case of the cleaning device is located at the end of the housing of the floor cleaning device 20 in driving direction, the brush 26 or the chassis 27 does not drive over the wet cleaned floor surface in response to cleaning. During the wet cleaning, the floor cleaning device 20 is furthermore controlled such that floor surfaces, which have already been cleaned wet, are not driven over again. In response to the calculation of the treatment path for wet cleaning, the control device 28 thus selects the transfer paths 19, 19', 19", 19''' such that they run through areas, which will be cleaned wet at a later point in time. However, this only takes place based on the floor surfaces, which are to be cleaned wet.

At the end of the second treatment step, the floor cleaning device reaches the base station 9, where the dirty water tank is emptied.

It is considered to be particularly advantageous for the floor cleaning device 2 to encompass cleaning devices, which differ from one another and which can be operated in different driving directions of the floor cleaning device 20. The invention thus proposes a vacuuming and mopping robot in one device. The maintenance effort has thus been reduced. The device can cooperate with a base station 9 of a simple design, which is able to supply the floor cleaning device 20 and to dispose of dirty water or dust, respectively. Because it is used in two ways, the combined dust, dirty water collection container 25 can be designed so as to be relatively large. This results in comparatively long cleaning times. In the "drive-over mode", the device makes it possible to specifically approach locations, which are to be cleaned wet, of a room, which is to be cleaned.

Due to the fact that the brush 26 is arranged between wetting device 23 and suction mouth 21, but also upstream of the suction channel 22, based on the driving direction in response to dry cleaning, it can also be used in two ways. It can be used in response to wet cleaning and in response to dry cleaning.

The floor cleaning device can encompass a rectangular or D-shaped base area. The wet cleaning aggregate 21, 23, as well as the dry cleaning aggregate 26, 22, extends across the entire vehicle width.

The dry cleaning aggregate 26, 22 and the wet cleaning aggregate 21, 23, can be lifted in vertical direction. Provision is thus made in particular for the suction mouth 21 and suction lips, which are fastened thereto, the suction channel 22, the wetting device 23 and the brush 26 to be capable of being lifted in vertical direction. This takes place by means of suitable motor drives. A vertical lifting is provided in particular for the "drive-over mode".

The above explanations serve to explain the inventions, which are captured as a whole by the application and which in each case further embody the state of the art independently, at least by means of the following feature combinations, namely:

A method, which is characterized in that, in the first operating step, areas of the floor surfaces 1, 2, 3, 4, 5, 6, 6', 7, which are to be cleaned, are determined, which are cleaned in at least a second operating step by means of a second cleaning device 21, 23, 24, or which are excluded from the cleaning by means of the second cleaning device 21, 23, 24;

A floor cleaning device, which is characterized by a second cleaning device 21, 23, 24 for wet cleaning areas 2, 3, 4, 6 and 7 of the floor surface 1, 2, 3, 4, 5, 6, 6', 7;

A floor cleaning device, which is characterized in that the first cleaning device encompasses a mechanical cleaning member, in particular a brush 26, and a suction channel 22, which is arranged downstream from the mechanical cleaning member in a first driving direction A of the cleaning device 20, and that the second cleaning device encompasses a suction mouth 21 for extracting a moisture, which is applied to the floor surface, which is to be cleaned, wherein the suction mouth 21 is arranged downstream from the mechanical cleaning member and downstream from the chassis 27 in a second driving direction B, which is oriented opposite to the first driving direction A of the cleaning device 20;

A floor cleaning device, which is characterized in that the floor cleaning device 20 encompasses a control device 28, which cooperates with sensor elements 29, so as to drive across a treatment path 11, 12, 13, 14, 15, 16, 16', 17 across the floor surface 1, 2, 3, 4, 5, 6, 6', 7, which is to be cleaned, according to a predetermined driving strategy, or according to a predetermined algorithm, which is calculated on the basis of data, which are detected by means of sensors 29;

A floor cleaning device, which is characterized in that, based on the second driving direction B, the suction mouth 21 is arranged at the end of the floor cleaning device 20;

A floor cleaning device, which is characterized in that the suction channel 22 and a wetting device 23 are arranged between a drive wheel 27, which is formed by the chassis, and a brush 26, which is in particular rotatably driven;

A floor cleaning device, which is characterized in that the floor cleaning device 20 encompasses a fresh water tank 24, a collection container 25 for dust and dirty water;

A floor cleaning device, which is characterized in that the first cleaning device 22, 26 and/or the second cleaning device 21, 23, 24 can be displaced in vertical direction from an active position into a passive position;

A self-propelled floor cleaning device, which is characterized in that, in the first operating step, areas of the floor surfaces 1, 2, 3, 4, 5, 6, 6', 7, which are to be cleaned, which are cleaned in at least a second operating step by means of a second cleaning device 21, 23, 24, or which are excluded from the cleaning by means of the second cleaning device 21, 23, 24, are determined;

A method, which is characterized in that a dry cleaning is carried out in the first operating step and a wet cleaning is carried out in the second operating step, wherein only the areas 2, 3, 6, 7, which are determined during the first operating step, are cleaned in the second operating step;

A method, which is characterized in that the dust collection container 25 is used as dust collection container during the dry cleaning and as dirty water container during the wet cleaning;

A method, which is characterized in that the second operating step takes place at a base station 9 after the dust container 25 is emptied and after the fresh water tank 24 is filled.

List of Reference Numerals:

| | |
|---|---|
| 1 | floor surface |
| 2 | floor surface |
| 3 | floor surface |
| 4 | floor surface |
| 5 | floor surface |
| 6 | floor surface |
| 6' | floor surface |
| 7 | floor surface |
| 8 | floor surface |
| 9 | base station |
| 11 | treatment path/driving path |
| 12 | treatment path/driving path |
| 13 | treatment path/driving path |
| 14 | treatment path/driving path |
| 15 | treatment path/driving path |
| 16 | treatment path/driving path |
| 16' | treatment path/driving path |
| 17 | treatment path/driving path |
| 18 | treatment path/driving path |
| 19 | transfer path |
| 20 | floor cleaning device |
| 21 | suction mouth |
| 22 | suction channel (dust) |
| 23 | wetting device |
| 24 | fresh water tank |
| 25 | dust collection container |
| 26 | brush |
| 27 | drive wheel |
| 28 | control electronics |
| 29 | sensor elements |
| A | driving direction |
| B | driving direction |

What is claimed is:

1. A method for operating a self-propelled floor cleaning device having first and second cleaning devices disposed therein, comprising the following steps:

driving the floor cleaning device across floor surfaces to be cleaned in a first operating step using on-board sensors, according to a predetermined driving strategy, or according to a predetermined algorithm, which is calculated on the basis of data, driving the floor cleaning device across the floor surfaces to be cleaned in at least a second operating step, such that the floor surfaces driven over in the second operating step are also driven over in the first operating step;

cleaning at least a portion of the floor surfaces with the first cleaning device during the first operating step;

detecting during the first operating step, by means of the sensors, areas of the floor surfaces which are to be cleaned in at least the second operating step, and which are excluded from the cleaning in the second operating step, based on a determination by the sensor of a surface quality of the floor surfaces, such that the sensor distinguishes at least between floor surfaces made of carpet, floor surfaces made of plastic, and floor surfaces made of wood; and cleaning in the second operating step with the second cleaning device only said areas of the floor surface detected in the first operating step to be cleaned in the second operating step, wherein during the step of driving the floor cleaning device in the second operating step, the floor cleaning device is driven over the areas detected in the first operating step to be excluded from cleaning in the second operating step, without cleaning said areas to be excluded, or the floor cleaning device omits driving over said areas detected to be excluded, and wherein the step of cleaning with the first cleaning device is a dry cleaning and the step of cleaning with the second cleaning device is a wet cleaning.

2. A method for operating a self-propelled floor cleaning device having first and second cleaning devices disposed therein, comprising the following steps:

driving the floor cleaning device across floor surfaces to be cleaned in a first operating step using on-board sensors, according to a predetermined driving strategy, or according to a predetermined algorithm, which is calculated on the basis of data, driving the floor cleaning device across the floor surfaces to be cleaned in at least a second operating step, such that the floor surfaces driven over in the second operating step are also driven over in the first operating step;

cleaning at least a portion of the floor surfaces with the first cleaning device during the first operating step;

detecting during the first operating step, by means of the sensors, areas of the floor surfaces which are to be cleaned in at least the second operating step, and which are excluded from the cleaning in the second operating step, based on a determination by the sensor of a surface quality of the floor surfaces, such that the sensor distinguishes at least between floor surfaces made of carpet, floor surfaces made of plastic, and floor surfaces made of wood; and cleaning in the second operating step with the second cleaning device only said areas of the floor surface detected in the first operating step to be cleaned in the second operating step, wherein during the step of driving the floor cleaning device in the second operating step, the floor cleaning device is driven over the areas detected in the first operating step to be excluded from cleaning in the second operating step, without cleaning said areas to be excluded, or the floor cleaning device omits driving over said areas detected to be excluded, and wherein the step of cleaning with the first cleaning device is a dry cleaning and the step of cleaning with the second cleaning device is a wet cleaning, and wherein the step of cleaning with the first cleaning device takes place in a direction of movement that is opposite a direction of movement of the step of cleaning with the second cleaning device.

3. The method according to claim 1, further comprising the step of depositing dust collected during the dry cleaning in a dust collection container and depositing dirty water collected during the wet cleaning in the same dust collection container.

4. The method according to claim 3, wherein the second operating step commences at a base station after the dust collection is emptied and after a fresh water tank of the cleaning device is filled.

* * * * *